United States Patent [19]
Mori et al.

[11] 3,853,919
[45] Dec. 10, 1974

[54] MYCOPHENOLIC ACID DERIVATIVES

[75] Inventors: Takasi Mori, Tokyo; Sakae Takaku, Ageo; Seikichi Suzuki, Tokyo, all of Japan

[73] Assignee: Chugai Seiyaku Kabushiki Kaisha, Tokyo, Japan

[22] Filed: Feb. 13, 1973

[21] Appl. No.: 332,102

[30] Foreign Application Priority Data
Feb. 24, 1972  Japan................................ 47-18447

[52] U.S. Cl............................... 260/343.3, 424/227
[51] Int. Cl.................................. C07d 5/06
[58] Field of Search................................. 260/343.3

[56] References Cited
UNITED STATES PATENTS
3,705,894  12/1972  Gerzon et al. ................... 260/343.3

OTHER PUBLICATIONS
Wagner & Zook, Synthetic Organic Chemistry, New York, Wiley and Sons, Inc., 1953, section 418 relied on.

Primary Examiner—Donald G. Daus
Assistant Examiner—Anne Marie T. Tighe
Attorney, Agent, or Firm—Browdy and Neimark

[57] ABSTRACT

Mycophenolic acid derivatives represented by the formula

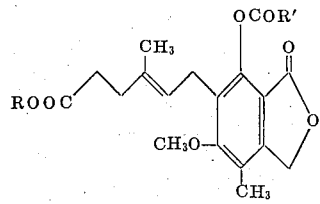

wherein R and R' are as defined hereinafter, which are useful as an anti-cancer or anti-tumor agent and a process for the production thereof are disclosed.

32 Claims, No Drawings

MYCOPHENOLIC ACID DERIVATIVES

BACKGROUND OF THE INVENTION

1. Field of the Invention

This invention relates to mycophenolic acid derivatives and the process for the production thereof. More particularly, the present invention relates to the mycophenolic acid derivatives represented by the formula

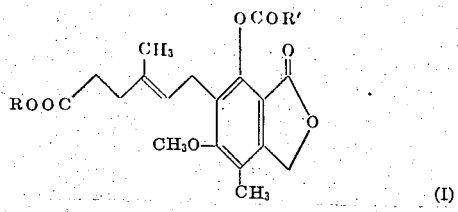

(I)

wherein R represents a lower alkyl group or a lower alkenyl group; R' is selected from the group consisting of

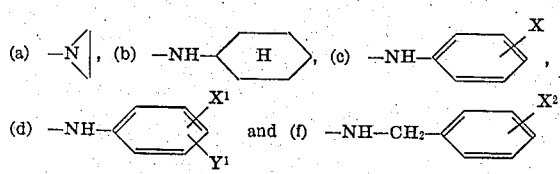

wherein X is selected from the group consisting of a hydrogen atom, an alkyl group containing 1 to 4 carbon atoms, an alkoxy group containing 1 to 4 carbon atoms, an acyl group containing 2 to 5 carbon atoms, a halogen atom, an alkoxycarbonyl group containing 2 to 5 carbon atoms, an acylamino group containing 2 to 5 carbon atoms, a dialkylamino ethoxycarbonyl group containing 5 to 7 carbon atoms, a dialkylamino group containing 2 to 8 carbon atoms, a hydroxy group, a carboxy group, a sulfamoyl group, a nitro group, a cyano group and a phenyl group; $X^1$ and $Y^1$ may be the same or different and are selected from the group consisting of an alkyl group containing 1 to 4 carbon atoms, a hydroxy group, a carboxy group and a nitro group; and $X^2$ is selected from the group consisting of a hydrogen atom, a halogen atom and a dialkylamino group containing 2 to 8 carbon atoms.

2. Description of the Prior Art

Mycophenolic acid is an antibiotic found in the fermentation broth of *Penicillium brevi-compactum* and is known to have weak growth inhibitory activity against Gram-positive microorganisms, fungi and yeasts. Recently, attention has been drawn to the anti-cancer activity of mycophenolic acid in view of the fact that mycophenolic acid is found to have a potent inhibitory activity on the implanted tumor in a wide variety of animal species. However, the therapeutic index of mycophenolic acid is not said to be satisfactory.

SUMMARY OF THE INVENTION

The present inventors conducted an extensive investigation on the above matters and as a result succeeded in synthesis of mycophenolic derivatives having excellent anti-cancer activity.

An object of this invention is therefore to provide mycophenolic acid derivatives represented by the above formula (I) which are useful as an anti-cancer or anti-tumor agent.

Another object of this invention is to provide a process for the production of mycophenolic acid derivatives represented by the formula (I).

These and other objects of this invention will be apparent by those skilled in the art by referring to the description given hereinafter.

DETAILED DESCRIPTION OF THE INVENTION

In accordance with the process of this invention, the mycophenolic acid derivatives represented by the above formula (I) can be prepared by reacting a compound represented by the formula

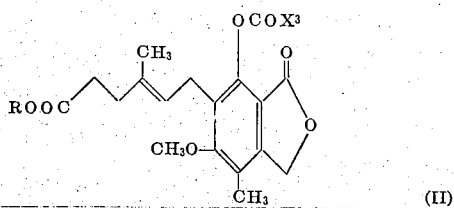

(II)

wherein R is as defined above and $X^3$ represents a halogen atom, with an amine compound of the formula

(III)

wherein R' is as defined above.

The compound represented by the formula (II) above used as a starting material of the process of this invention can be prepared from mycophenolic acid by the conventional esterification followed by the reaction with phosgene or the like. The amine compound (III) used as the other reactant of this invention includes ethylenimine, aniline, m-toluidine, p-toluidine, p-methoxyaniline, p-aminophenol, p-aminobenzoic acid, p-aminoacetophenone, m-chloroaniline, p-chloroaniline, ethyl p-aminobenzoate, p-acetylaminoaniline, p-aminobiphenyl, p-diethylaminoaniline, p-(2'-diethylaminoethoxycarbonyl)-aniline, 3-nitro-4-methylaniline, 2,4-dimethylaniline, 2-oxy-4-aminobenzoic acid, benzylamine, m-chlorobenzylamine, sulfanylamide, p-(diethylaminobenzyl)-amine, cyclohexylamine or the like.

In the process of this invention, the reaction between the compound (II) and the amine compound (III) can be carried out in the presence or absence of a reaction solvent. The reaction solvent which can preferably be used in the present invention includes an organic inert solvent such as benzene, diethyl ether, tetrahydrofuran, dioxane, chloroform, methylene chloride, ethyl acetate, carbon tetrachloride or the like. The reaction temperature is not critical and is preferably in the range of from $-10°$ to $50°C$, more preferably in the range of $0°$ to $30°C$, for a period of from 1 to 5 hours. The process of this invention is a reaction which releases an acid of the formula $HX^3$, and, therefore, the reaction between the compound (II) and the amine (III) is preferably carried out in the presence of a tertiary amine such as triethylamine, pyridine, N,N-dimethylaniline, N-methylpyrolidine, N-methylpiperidine or the like or an inorganic base such as sodium carbonate, potassium carbonate or the like. Alternatively, the reaction may be conducted by using more than two molar equivalents of the amine compound (III) per one molar equivalent of the compound (II) instead of using the above tertiary amine or inorganic base. If the amine compound (III) carries any reactive group other than the reactive moiety which takes part in the reaction of this invention, it is advantageous to carry out the reaction after protecting these reactive groups, if necessary.

In the reaction for producing the mycophenolic acid derivatives (I), the desired compound (I) can be isolated from the reaction mixture by any one of the conventional procedures, for example, by filtration of the reaction mixture followed by concentration of the filtrate or by extraction of the reaction mixture with an organic solvent followed by concentration of the extract. The thus obtained product can then be purified by a conventional procedure such as recrystallization from an appropriate solvent or a solvent system.

The present invention is further illustrated by the following experiments and Examples, but they are given for the illustrative purpose only and are not to be construed as limiting the scope of this invention.

Experiment 1

Activity on L-1210 Leukemia Tumor $BDF_1$ mice (body weight, 20 g ± 2 g) were intraperitoneally implanted with $1 \times 10^6$ cells/mouse of L-1210 leukemia tumor cells, and, 20 hours after the implantation, each of the test compounds was intraperitoneally administered to the mice at the dose of 150 mg/kg once a day over a period of 5 days. The survival period (days) of the test mice was determined, and the activity of the test compounds was evaluated in terms of T/C (an average survival day of the treated mice/an average survival day of the non-treated mice).

Activity on Hypodermically Implanted Ehrlich Tumor 4 cs mice (male; body weight, 20 g ± 2 g) were hypodermically implanted with $5 \times 10^6$ cells/mouse of Ehrlich ascites-tumor cells, and, 20 hours after the inoculation, each of the test compounds was intraperitoneally administered to the mice at the dose of 150 mg/kg once a day over a period of 5 days. The tumor weight of the sacrificed mice was determined 10 days after the implantation, and the activity of the test compounds was evaluated in terms of T/C (the average tumor weight of the treated mice/the average tumor weight of the non-treated mice).

In the above tests, the test compounds were used as a solution dissolved in distilled water or as a suspension in distilled water containing 0.5% CMC.

The results obtained in the above experiments are shown in Table 1 below.

Table 1

Antitumor Activity of Mycophenolic Acid Derivatives Activity*

| Compound | T/C in L-1210 | T/C in Ehrlich Tumor |
|---|---|---|
| Example 1 | ++++ | +++ |
| Example 2 | +++ | ++++ |
| Example 3 | +++ | ++ |
| Example 4 | ++++ | ++ |
| Example 5 | + | ++ |
| Example 6 | ++++ | ++++ |
| Example 7 | ++++ | +++ |
| Example 8 | ++++ | +++ |
| Example 9 | +++ | +++ |
| Example 10 | +++++ | +++ |
| Example 11 | ++++ | + |
| Example 12 | ++++ | +++ |
| Example 13 | ++++ | ++ |
| Example 14 | ++++ | + |
| Example 15 | +++ | +++ |

Table 1-Continued

Antitumor Activity of Mycophenolic Acid Derivatives Activity*

| Compound | T/C in L-1210 | T/C in Ehrlich Tumor |
|---|---|---|
| Example 16 | ++ | +++ |
| Example 17 | ++ | ++ |
| Example 18 | ++ | ++++ |
| Example 19 | ++ | + |
| Example 20 | +++ | ++ |
| Example 21 | ++++ | +++ |
| Example 22 | ++++ | +++ |
| Example 23 | ++++ | +++ |
| Example 24 | ++++ | ++ |
| Example 25 | ++++ | +++ |
| Example 26 | +++ | +++ |
| Example 27 | +++ | ++ |
| Example 28 | +++ | ++ |
| Example 29 | ++++ | ++ |
| Example 30 | +++ | ++ |
| Example 31 | ++++ | +++ |
| Mycophenolic Acid | + | + |

| * | T/C in L-1210 | T/C in Ehrlich Tumor |
|---|---|---|
| ++++ | higher than 1.50 | lower than 0.10 |
| +++ | 1.40 – 1.49 | 0.11 – 0.20 |
| ++ | 1.30 – 1.39 | 0.21 – 0.30 |
| + | 1.20 – 1.29 | 0.31 – 0.40 |

It is apparent from the above results that the compounds of this invention exhibit an antitumor activity on L-1210 leukemia tumor superior to that of mycophenolic acid. It is also noted that most of the compounds are superior to mycophenolic acid in activity on the hypodermically implanted Ehrlich tumor cells.

Example 1

Methyl 5-[4'-(N,N-Ethylenecarbamoyloxy)-6'-Methoxy-7'-Methyl-3'-Oxo-5'-Phthalanyl]-3-Methyl-3-Pentene-1-Carboxylate A. About 100 g of phosgene was bubbled into 200 ml of dried benzene, and to the resulting solution was added dropwise a solution of 33.4 g of methyl mycophenolate and 7.91 g of pyridine in 100 ml of benzene over two hours while stirring at a temperature of from 0°C to 5°C. After stirring at room temperature for an additional 10 hours, the mixture was filtered to remove pyridine hydrochloride, and the filtrate was concentrated to obtain about 40 g of a crude product of methyl 5-(4'-chloroformyloxy-6'-methoxy-7'-methyl-3'-oxo-5'-phthalanyl)-3-methyl-3-pentene-1-carboxylate. The thus obtained crude product was a slightly yellow-colored powdery solid and recrystallization of the crude product from ether yielded a pure product having a melting point of from 80.5° to 81.5°C.

B. 3.96 g of the methyl 5-(4'-chloroformyloxy-6'-methoxy-7'-methyl-3'-oxo-5'-phthalanyl)-3-methyl-3-pentene-1-carboxylate obtained above was dissolved in 20 ml of tetrahydrofuran, and to the solution was added dropwise a mixture consisting of 0.41 g of ethylenimine, 0.98 g of triethylamine and 5 ml of tetrahydrofuran over 30 minutes at a temperature of 0°C while stirring. After stirring for an additional 1 hour, 50 ml of water was added to the mixture and the mixture was extracted with benzene. The benzene extract was washed with water, dried and concentrated under reduced pressure. The resulting residue was recrystallized first from a methanol-water solvent system and then from a benzene-hexane solvent system to obtain 2.9 g of a pure methyl 5-[4'-(N,N-ethylenecarbamoyloxy)-6'-methoxy-7'-methyl-3'-oxo- 5′-phthalanyl]-3-methyl-3-pentene-1-carboxylate having a melting point of 84°– 85°C.
Analysis: C, 62.62; H, 6.15; N, 3.53

Example 2

Ethyl 5-[4′-(N,N-Ethylenecarbamoyloxy)-6′-Methoxy-7′-Methyl-3′-Oxo-5′-Phthalanyl]-3-Methyl-3-Pentene-1-Carboxylate A. In the same manner as described in Example 1, Part (A), ethyl mycophenolate was reacted with phosgene to obtain ethyl 5-(4′-chloroformyloxy-6′-methoxy-7′-methyl-3′-oxo-5′-phthalanyl)-3-methyl-pentene-1-carboxylate having a melting point of 79.5°C –80.5°C.

B. In the same manner as described in Example 1, Part (B), ethyl 5-(4′-chloroformyloxy-6′-methoxy-7′-methyl-3′-oxo-5′-phthalanyl)-3-methyl-3-pentene-1-carboxylate was reacted with ethylenimine to obtain ethyl 5-[4′-(N,N-ethylenecarbamoyloxy)-6′-methoxy-7′-methyl-3′-oxo-5′-phthalanyl]-3-methyl-3-pentene-1-carboxylate having a melting point of 78° – 79°C.
Analysis: C, 63.66; H, 6.44; N, 3.39

Example 3 n-Butyl 5-[4′-(N,N-Ethylenecarbamoyloxy)-6′-Methoxy-7′-Methyl-3′-Oxo-5-Phthalanyl]-3-Methyl-3-Pentene-1-Carboxylate A. In the same manner as described in Example 1, Part (A), butyl mycophenolate was reacted with phosgene to obtain n-butyl 5-(4′-chloroformyloxy-6′-methoxy-7′-methyl-3′-oxo-5′-phthalanyl)-3-methyl-3-pentene-1-carboxylate which was not easily crystallized and used directly in the next reaction.

B. In the same manner as described in Example 1, Part (B), n-butyl 5-(4′-chloroformyloxy-6-methoxy-7′-methyl-3′-oxo-5′-phthalanyl)-3-methyl-3-pentene-1-carboxylate was reacted with ethylenimine to obtain n-butyl 5-[4′-(N,N-ethylenecarbamoyloxy)-6′-methoxy-7′-methyl-3′-oxo-5′phthalanyl]-3-methyl-3-pentene-1-carboxylate. The thus obtained product was a viscous oily substance which was not easily crystallized, and was purified by column chromatography using a powder cellulose.
Analysis: C, 64.69; H, 6.80; N, 3.11

Example 4

Ethyl 5-[4′-{N-(p-Acetylphenyl)-Carbamoyloxy}-6′-Methoxy-7′-Methyl-3′-Oxo-5′-Phthalanyl]-3-Methyl-3-Pentene-1-Carboxylate 2 g of ethyl 5-(4′-chloroformyloxy-6′-methoxy-7′-methyl-3′-oxo-5′-phthalanyl)-3-methyl-3-pentene-1-carboxylate was dissolved in 20 ml of tetrahydrofuran, and to the solution was added dropwise a solution of 1.51 g of p-aminoacetophenone in 10 ml of tetrahydrofuran over 30 minutes at a temperature of 0°C while stirring. After stirring for an additional 1 hour at room temperature, 50 ml of water was added to the mixture and the mixture was extracted with ethyl acetate. The organic layer was washed with 1N-hydrochloric acid followed by with water, dried and concentrated. The resulting residue was recrystallized from ethanol to give 1.5 g of ethyl 5-[4′-{-(p-acetylphenyl)-carbamoyloxy}-6′-methoxy-7′-methyl-3′-oxo-5′-phthalanyl]-3-methyl-3-pentene-1-carboxylate having a melting point of 159° – 160°C.
Analysis: C, 66.21; H, 6.13; N, 2.83

Example 5

Methyl 5-[4′-(N-Phenylcarbamoyloxy)-6′-Methoxy-7-Methyl-3′-Oxo-5′-Phthalanyl]-3-Methyl-3-Pentene-1-Carboxylate In the same manner as described in Example 4, methyl 5-(4′-chloroformyloxy-6′-methoxy-7′-methyl-3′-oxo-5′-phthalanyl)-3-methyl-3-pentene-1-carboxylate was reacted with aniline to obtain methyl 5[4′-(N-phenylcarbamoyloxy)-6′-methoxy-7′-methyl-3′-oxo-5′-phthalanyl]-3-methyl-3-pentene-1-carboxylate having a melting point of 115° – 116°C.
Analysis: C, 65.96; H, 5.84; N, 3.34

Example 6

Ethyl 5-[4′-{N-(p-Methylphenyl)-Carbamoyloxy}-6′-Methoxy-7′-Methyl-3′-Oxo-5′-Phthalanyl -3-Methyl-3-Pentene-1-Carboxylate In the same manner as described in Example 4, ethyl 5-(4′-chloroformyloxy-6′-methoxy-7′-methyl-3′-oxo-5′-phthalanyl)-3-methyl-3-pentene-1-carboxylate was reacted with p-toluidine to obtain 5-[4′-{N-(p-methylphenyl)-carbamoyloxy}-6′-methoxy-7′-methyl-3′-oxo-5′-phthalanyl]-3-methyl-3-pentene-1-carboxylate having a melting point of 98.5° – 99.5°C.
Analysis: C, 67.41; H, 6.51; N, 3.00

Example 7

Ethyl 5-[4′-{N-(p-Methoxyphenyl)-Carbamoyloxy}-6′-Methoxy-7′-Methyl-3′-Oxo-5′-Phthalanyl]-3-Methyl-3′-Oxo-5′-Phthalanyl]-3-Methyl-3-Pentene-1-Carboxylate In the same manner as described in Example 4, ethyl 5-(4′-chloroformyloxy-6′-methoxy-7′-methyl-3′-oxo-5′-phthalanyl-3-methyl-3-pentene-1-carboxylate was reacted with p-methoxyaniline to obtain ethyl 5-[4′-{N-(p-methoxyphenyl)-carbamoyloxy}-6′-methoxy-7′-methyl-3′-oxo-5′-phthalanyl]-3-methyl-3-pentene-1-carboxylate having a melting point of 118° – 119°C.
Analysis: C, 65.35; H, 6.31; N, 2.86

Example 8

Ethyl 5-[4′-{N-(p-Hydroxyphenyl)-Carbamoyloxy}-6′-Methoxy-7′-Methyl-3′-Oxo-5′-Phthalanyl]-3-Methyl-3-Pentene-1-Carboxylate In the same manner as described in Example 4, ethyl 5-(4′-chloroformyloxy-6′-methoxy-7′-methyl-3′-oxo-5′-phthalanyl-3-methyl-3-pentene-1-carboxylate was reacted with p-aminophenol to obtain ethyl 5-[4′-{N-(p-hydroxyphenyl)-carbamoyloxy}-6′-methoxy-7′-methyl-3′-oxo-5′-phthalanyl]-3-methyl-3-pentene-1-carboxylate having a melting point of 186° – 188°C.
Analysis: C, 64.50; H, 6.37; N, 2.91

Example 9

Ethyl 5-[4′-{N-(p-Carboxyphenyl)-Carbamoyloxy}-6′-Methoxy-7′-Methyl-3′-Oxo-5′-Phthalanyl]-3-Methyl-3-Pentene-1-Carboxylate 2.5 g of ethyl 5-(4′-chloroformyloxy-6′-methoxy-7′-methyl-3′-oxo-5′-phthalanyl)-3-methyl-3-pentene-1-carboxylate was dissolved in 20 ml of tetrahydrofuran, and to the solution was added dropwise a solution of 1.7 g of p-aminobenzoic acid in 10 ml of tetrahydrofuran over 20 minutes while ice-cooling and stirring. After stirring for an additional 3 hours at room temperature, 100 ml of 0.1N-hydrochloric acid was added to the mixture, and the crystals which precipitated were filtered, washed with water and dried under reduced pressure. The thus obtained product was recrystallized from an ethanol-benzene-hexane solvent system to give 2.4 g of pure ethyl 5-[4′-{N-(p-carboxyphenyl)-carbamoyloxy} -6′-methoxy-7′-methyl-3′-oxo-5′-phthalanyl]-3-methyl-3-pentene-1-carboxylate having a melting point of 185° – 186°C (with decomposition;

the melting point was somewhat different depending upon the rate of heating).

Analysis: C, 63.29; H, 5.70; N, 2.60

Example 10

Ethyl 5-[4'-{N-(p-Chlorophenyl)-Carbamoyloxy}-6'-Methoxy-7'-Methyl-3'-Oxo-5-Phthalanyl]-3-Methyl-3-pentene-1-Carboxylate In the same manner as described in Example 4, ethyl 5-(4'-chloroformyloxy-6'-methoxy-7'-methyl-3'-oxo-5'-phthalanyl)-3-methyl-3-pentene-1-carboxylate was reacted with p-chloroaniline to obtain ethyl 5-[4'-{N-(p-chlorophenyl)-carbamoyloxy}-6'-methoxy-7'-methyl-3'-oxo-5'-phthalanyl]-3-melthyl-3-pentene-1-carboxylate having a melting point of 116.5° – 117.5°C.

Analysis: C, 62.00; H, 5.55; N, 7.88

Example 11

Ethyl 5-[4'-{N-(p-Ethoxycarbonylphenyl)-Carbamoyloxy}-6'-Methoxy-7'-Methyl13'-Oxo-5'-Phthalanyl]-3-Methyl-3-Pentene-1-Carboxylate In the same manner as described in Example 4, ethyl 5-(4'-chloroformyloxy-6'-methoxy-7'-methyl-3'-oxo-5'-phthalanyl)-3-methyl-3-pentene-1-carboxylate was reacted with ethyl p-aminobenzoate to obtain ethyl 5-[4'-{N-(p-ethoxy-carbonylphenyl)-carbamoyloxy}-6'-methoxy-7'-methyl-3'-oxo-5'-phthalanyl]-3-methyl-3-pentene-1-carboxylate having a melting point of 448° – 150°C.

Analysis: C, 64.26; H, 6.02; N, 2.44

Example 12

Ethyl 5-[4'-{N-(p-Acetylaminophenyl)-Carbamoyloxy}-6'-Methoxy-7'-Methyl-3'-Oxo-5'-Phthalanyl]-3-Methyl-3-Pentene-1-Carboxylate In the same manner as described in Example 4, ethyl 5-(4'-chloroformyloxy-6'-methoxy-7'-methyl-3'-oxo-5'-phthalanyl)-3-methyl-3-pentene-1-carboxylate was reacted with p-acetylaminoaniline to obtain 5-[4'-{N-(p-acetylaminnophenyl)-carbamoyloxy}-6'-methoxy-7'-methyl-3'-oxo-5'-phthalanyl]-3-methyl-3-pentene-1-carboxylate having a melting point of 175° – 177°C.

Analysis: C, 64.27; H, 6.08; N, 5.37

Example 13

Ethyl 5-[4'-{N-(p-Sulphamoylphenyl)-Carbamoyloxy}-6'-Methoxy-7'-Methyl-3'-Oxo-5'-Phthalanyl]-3-Methyl-3-Pentene-1-Carboxylate In the same manner as described in Example 4, ethyl 5-(4'-chloroformyloxy-6'-methoxy-7'-methyl-3'-oxo-5'-phthalanyl)-3-methyl-3-pentene-1-carboxylate was reacted with p-aminobenzenesulfonamide to obtain ethyl 5-[4'{N-(p-sulphamoylphenyl)-carbamoyloxy}-6'-methoxy-7'-methyl-3'-oxo-5'-phthalanyl]-3-methyl-3-pentene-1-carboxylate having a melting point of 150° – 153°C.

Analysis: C, 57.28; H, 5.61; IN, 5.22

Example 14

Ethyl 5-[4'-{N-(p-Phenyl-Phenyl)-Carbamoyloxy}-6'-Methoxy-7'-Methyl-3'-Oxo-5'-Phthalanyl]-3-Methyl-3-Pentene-1-Carboxylate In the same manner as described in Example 4, ethyl 5-(4'-chloroformyloxy-6'-methoxy-7'-methyl-3'-oxo-5'-phthalanyl)-3-methyl-3-pentene-1-carboxylate was reacted with p-aminobiphenyl to obtain ethyl 5-[4'-{N-(p-phenyl-phenyl)-carbamoyloxy}-6'-methoxy-7'-methyl-3'-oxo-5'-phthalanyl]-3-methyl-3-pentene-1-carboxylate having a melting point of 110° – 112°C.

Analysis: C, 70.83; H, 6.09; N, 2.44

Example 15

Ethyl 5-[4'-{N-(p-Diethylaminophenyl)-Carbamoyloxy}-6'-Methoxy-7'-Methyl-3'-Oxo-5'-Phthalanyl]-3-Methyl-3-Pentene-1-Carboxylate Hydrochloride 2.1 g of ethyl 5-(4'-chloroformyloxy-6'-methoxy-7'-methyl-3'-oxo-5'-phthalanyl)-3-methyl-3-pentene-1-carboxylate was dissolved in 30 ml of chloroform, and to the solution was added dropwise a solution of 0.82 g of p-diethylaminoaniline in 10 ml of chloroform over 30 minutes at a temperature of 0°C while stirring, followed by stirring for an additional 30 minutes at room temperature. The reaction mixture was concentrated under reduced pressure and the resulting residue was recrystalized from ethanol to give 2.3 g of ethyl 5-[4'-{N-(p-diethylaminophenyl)-carbamoyloxy}-6'-methoxy-7'-methyl-3'-oxo-5'-phthalanyl]-3-methyl-3-pentene-1-carboxylate hydrochloride having a melting point of 187° – 189°C (decomposition).

Analysis: C, 62.71; H, 6.92; N, 4.86

Example 16

Ethyl 5-[4'-{N-(p-($\beta$-Diethylaminoethoxycarbonyl)-phenyl)-Carbamoyloxy}-6'-Methoxy-7'-Methyl-3'-Oxo-5'-Phthalanyl]-3-Methyl-3-Pentene-1-Carboxylate Hydrochloride In the same manner as described in Example 15, ethyl 5-(4'-chloroformyloxy-6'-methoxy-7'-methyl-3'-oxo-5'-phthalanyl)-3-methyl-3-pentene-1-carboxylate was reacted with p-($\beta$-diethylaminoethoxycarbonyl)-aniline to give 5-[4'-{N-(p-($\beta$-diethylaminoethoxycarbonyl)-phenyl)-carbamoyloxy}-6'-methoxy-7'-methyl-3'-oxo-5'-phthalanyl]-3-methyl-3-pentene-1-carboxylate hydrochloride having a melting point of 146° – 148°C (decomposition).

Analysis: C, 60.93; H, 6.53; N, 4.34

Example 17

Ethyl 5-[4'-{N-(p-Dimethylaminophenyl)-Carbamoyloxy}-6'-Methoxy-7'-Methyl-3'-Oxo-5'-Phthalanyl]-3-Methyl-3-Pentene-1-Carboxylate Hydrochloride In the same manner as described in Example 15, ethyl 5-(4'-chloroformyloxy-6'-methoxy-7'-methyl-3'-oxo-5'-phthalanyl)-3-methyl-3-pentene-1-carboxylate was reacted with N,N-dimethyl-p-phenylenediamine to obtain ethyl 5-[4'-{N-(p-dimethylaminophenyl)-carbamoyloxy}-6'-methoxy-7'-methyl-3'-oxo-5'-phthalanyl]-3-methyl-3-pentene-1-carboxylate hydrochloride having a melting point of 171° – 173°C (decomposition).

Analysis: C, 61.40; H, 6.79; N, 5.09

Example 18

Ethyl 5-[4'-{N-(p-Diethylaminobenzyl)-Carbamoyloxy}-6'-Methoxy-7'-Methyl-3'-Oxo-5'-Phthalanyl]-3-Methyl-3-Pentene-1-Carboxylate Hydrochloride In the same manner as described in Example 15, ethyl 5-(4'-chloroformyloxy-6'-methoxy-7'-methyl-3'-oxo-5'-phthalanyl)-3-methyl-3-pentene-1-carboxylate was reacted with p-diethylaminobenzylamine to obtain ethyl 5-[4'-{N-(p-diethylaminobenzyl)-carbamoyloxy}-6'-methoxy-7'-methyl-3'-oxo-5'-phthalanyl]-3-methyl-3-pentene-1-carboxylate hydrochloride having a melting point of 136° – 139°C (decomposition).

Analysis: C, 63.20; H, 6.71; N, 5.80

Example 19

Ethyl 5-[4'-{N-(p-Dimethylaminobenzyl)-Carbamoyloxy}-6'-Methoxy-7'-Methyl-3'-Oxo-5'-

Phthalanyl]-3-Methyl-3-Pentene-1-Carboxylate Hydrochloride

In the same manner as described in Example 15, ethyl 5-(4'chloroformyloxy-6'-methoxy-7'-methyl-3'-oxo-5'-phthalanyl)13-methyl-3-pentene-1-carboxylate was reacted with p-dimethylaminobenzylamine to obtain ethyl 5-[4'-{N-(p-dimethylaminobenzyl)-carbamoyloxy}-6'-methoxy-3'-methyl-3'-oxo-5'-phthalanyl]-3-methyl-3-pentene-1-carboxylate hydrochloride having a melting point of 123° – 125°C (decomposition).
Analysis: C, 62.24; H, 6.71; N, 5.08

Example 20 n-Butyl 5-[4'-{N-(p-Carboxyphenyl)-Carbamoyloxy}-6'-Methoxy-7'-Methyl-3'-Oxo-5'-Phthalanyl]-3-Methyl-3-Pentene-1-Carboxylate In the same manner as described in Example 9, n-butyl 5-(4'-chloroformyloxy)-6'-methoxy-7'-methyl-3'-oxo-5'-phthalanyl)-3-methyl-3-pentene-1-carboxylate was reacted with p-aminobenzoic acid to obtain n-butyl 5-[4'-{N-(p-carboxyphenyl)-carbamoyloxy}-6'-methoxy-7'-methyl-3'-oxo-5'-phthalanyl]-3-methyl-3-pentene-1-carboxylate having a melting point of 177° – 180°C (decomposition).
Analysis: C, 64.65; H, 6.14; N, 2.53

Example 21

Ethyl 5-[4'-(N-Phenylcarbamoyloxy)16'-Methoxy-7'-Methyl-3'-Oxo-5'-Phthalanyl]-3-Methyl-3-Pentene-1-Carboxylate In the same manner as described in Example 4, ethyl 5-(4'-chloroformyloxy-6'-methoxy-7'-methyl-3'-oxo-5'-phthalanyl)-3-methyl-3-pentene-1-carboxylate was reacted with aniline to obtain ethyl 5-[4'-(N-phenylcarbamoyloxy)-6'-methoxy-7'-methyl-3'-oxo-5'-phthalanyl)-3-methyl-3-pentene-1-carboxylate having a melting point of 117° – 119°C.
Analysis: C, 66.80; H, 6.21; N, 3.31

Example 22

Ethyl 5-[4'-{N-(m-Nitrophenyl)-Carbamoyloxy}-6'-Methoxy-7'-Methyl-3'-Oxo-5'-Phthalanyl]-3-Methyl-3-Pentene-Carboxylate In the same manner as described in Example 4, ethyl 5-94'-chloroformyloxy-6'-methoxy-7'-methyl-3'-oxo-5'-phthalanyl)-3-methyl-3-pentene-1-carboxylate was reacted with m-nitroaniline to obtain ethyl 5-[4'-{N-(m-nitrophenyl)-carbamoyloxy}-6'-methoxy-7'-methyl-3'-oxo-5'-phthalanyl]-3-methyl-3-pentene-1-carboxylate having a melting point of 149° – 150°C.
Analysis: C, 60.92; H, 5.53; N, 5.62

Example 23

Ethyl 5-[4'-{N-(p-Cyanophenyl)-Carbamoyloxy}-6'-Methoxy-7'-Methyl-3'-Oxo-5'-Phthalanyl]-3-Methyl-3-Pentene-1-Carboxylate In the same manner as described in Example 4, ethyl 5-(4'-chloroformyloxy-6'-methoxy-7'-methyl-3'-oxo-5'-phthalanyl)-3-methyl-3-pentene-1-carboxylate was reacted with p-cyanoaniline to obtain ethyl 5-[4'-{N-(p-cyanophenyl)-carbamoyloxy}-6'-methoxy-7'-methyl-3'-oxo-5'-phthalanyl]-3-methyl-3-pentene-1-carboxylate having a melting point of 143° – 145°C.
Analysis: C, 66.00; H, 5.72; N, 5.78

Example 24

Ethyl 5-[4'-{N-(m-Methylphenyl)-Carbamoyloxy}-6'-Methoxy-7'-Methyl-3'-Oxo-5'-Phthalanyl]-3-Methyl-3-Pentene-1-Carboxylate In the same manner as described in Example 4, ethyl 5-(4'-chloroformyloxy-6'-methoxy-7'-methyl-3'-oxo-5'-phthalanyl)-3-methyl-3-pentene-1-carboxylate was reacted with m-toluidine to give ethyl 5-[4'-{N-(m-methylphenyl)-carbamoyloxy}-6'-methoxy-7'-methyl-3'-oxo-5'-phthalanyl]-3-methyl-pentene-1-carboxylate having a melting point of 98° – 100°C.
Analysis: C, 67.09; H, 6.48; N, 2.93

Example 25

Ethyl 5-[4'-{N-(m-Chlorophenyl)-Carbamoyloxy}-6'-Methoxy-7'-Methyl-3'-Oxo-5'-Phthalanyl]-3-Methyl-3-Pentene-1-Carboxylate In the same manner as described in Example 4,ethyl 5-(4'-chloroformyloxy-6'-methoxy-7'-methyl-3'-oxo-5'-phthalanyl)-3-methyl-3-pentene-1-carboxylate was reacted with m-chloroaniline to give ethyl 5-[4'-{N-(m-chlorophenyl)-carbamoyloxy}-6'-methoxy-7'-methyl-3'-oxo-5'-phthalanyl]-3-methyl-3-pentene-1-carboxylate having a melting point of 102° – 103°C.
Analysis: C, 61.88; H, 5.46; N, 2.78

Example 26

Ethyl 5-[4'-{N-(3''-Nitro-4''-Methylphenyl)-Carbamoyloxy}-6'-Methoxy-7'-Methyl-3'-Oxo-5'-Phthalanyl]-3-Methyl-3-Pentene-1-Carboxylate In the same manner as described in Example 4, ethyl 5-(4'-chloroformyloxy-6'-methoxy-7'-methyl-3'-oxo-5'-phthalanyl)-3-methyl-3-pentene-1-carboxylate was reacted with 3-nitro-4-methylaniline to give ethyl 5 [4'-{N-(3''-nitro-4''-methylphenyl)-carbamoyloxy}-6'-methoxy-7'-methyl-3'-oxo-5'-phthalanyl]-3-methyl-3-pentene-1-carboxylate having a melting point of 142° – 143°C.
Analysis: C, 61.11; H, 5.64; N, 5.29

Example 27

Ethyl 5-[4'-{N-(2'',4''-Dimethylphenyl)-Carbamoyloxy}-6'-Methoxy-7'-Methyl-3'-Oxo-5'-Phthalanyl]-3-Methyl-3-Pentene-1-Carboxylate In the same manner as described in Example 4, ethyl 5-(4'-chloroformyloxy-6'-methoxy-7'-methyl-3'-oxo-5'-phthalanyl)-3-methyl-3-pentene-1-carboxylate was reacted with 2,4-dimethylaniline to give 5-[4'-{N-(2'',4''-dimethylphenyl)-carbamoyloxy}-6'-methoxy-7'-methyl-3'-oxo-5'-phthalanyl]-3-methyl-3-pentene-1-carboxylate having a melting point of 86° – 88°C.
Analysis: C, 67.00; H 6.91; N, 2.81

Example 28

Ethyl 5-[4'-{N-(3''-Oxy-4''-Carboxyphenyl)-Carbamoyloxy}-6'-Methoxy-7'-Methyl-3'-Oxo-5'-Phthalanyl]-3-Methyl-3-Pentene-1-Carboxylate 21.1 g of ethyl 5-(4'-chloroformyloxy-6'-methoxy-7'-methyl-3'-oxo-5'-phthalanyl)-3-methyl-3-pentene-1-carboxylate was dissolved in 30 ml of tetrahydrofuran, and to the solution was added 1.53 g of 2-oxy-4-aminobenzoic acid. The mixture was then stirred in a sealed vessel at room temperature. After 3 hours' reaction, 100 ml of water was added to the reaction mixture which was then extracted with chloroform. The chloroform layer was washed with 1N-hycrochloric acid followed by rinsing with water, dried and concentrated. The residual yellow oil thus obtained was dissolved in ether and the solution was allowed to stand to precipitate 1.9 g of ethyl 5-[4'-{N-(3''-oxy-4''-carboxyphenyl)-carbamoyloxy}-6'-methoxy-7'-methyl-3'-oxo-5'-phthalanyl]-3-methyl-3-pentene-1-carboxylate as white crystals having a melting point of 183° – 185°C (decomposition).
Analysis: C, 61.77; H, 5.64; N, 2.58

Example 29

Ethyl 5-[4'-(N-Benzylcarbamoyloxy)-6'-Methoxy-7'-Methyl-3'-Oxo-5'-Phthalanyl]-3-Methyl-3-Pentene-1-Carboxylate In the same manner as described in Example 4, ethyl 5-(4'-chloroformyloxy-6'-methoxy-7'-methyl-3'-oxo-5'-phthalanyl)-3-methyl-3-pentene-1-carboxylate was reacted with benzylamine to give 5-[4'-(N-benzylcarbamoyloxy)-6'-methoxy-7'-methyl-3'-oxo-5'-phthalanyl]-3-methyl-3-pentene-1-carboxylate having a melting point of 102° – 103°C.
Analysis: C, 67.65; H, 6.52; N, 2.99

Example 30

Ethyl 5-[4'-{N-(m-Chlorobenzyl)-Carbamoyloxy}-6'-Methoxy-7'-Methyl-3'-Oxo-5'-Phthalanyl]-3-Methyl-3-Pentene-1-Carboxylate In the same manner as described in Example 4, ethyl 5-(4'-chloroformyloxy-6'-methoxy-7'-methyl-3'-oxo-5'-phthalanyl)-3-methyl-3-pentene-1-carboxylate was reacted with m-chlorobenzylamine to give ethyl 5-[4'-{N-(m-chlorobenzyl)-carbamoyloxy}-6'-methoxy-7'-methyl-3'-oxo-5'phthalanyl]-3-methyl-3-pentene-1-carboxylate having a melting point of 122° – 123°C.
Analysis: C, 62.71; H, 5.99; N, 2.74

Example 31

Ethyl 5-[4'-(N-Cyclohexylcarbamoyloxy)-6'-Methoxy-7'-Methyl-3'-Oxo-5'-Phthalanyl]-3-Methyl-3-Pentene-1-Carboxylate In the same manner as described in Example 4, ethyl 5-(4'-chloroformyloxy-6'metoxy-7'-methyl-3'-oxo-5'-phthalanyl)-3-methyl-3-pentene-1-carboxylate was reacted with cyclohexylamine to give ethyl 5-[4'-(N-cyclohexylcarbamoyloxy)-6'-methoxy-7'-methyl-3'-oxo-5'-phthalanyl]- 3-methyl-3-pentene-1-carboxylate having a melting point of 143° – 144°C.
Analysis: C, 65.90; H, 7.20; N, 3.00

While the invention has been described in detail and with reference to specific embodiments thereof, it will be apparent that various changes and modifications can be made therein without departing from the spirit and scope thereof.

What is claimed is:

1. a compound of the formula:

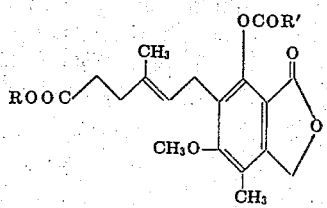

wherein R represents lower alkyl; R' is selected from the group consisting of

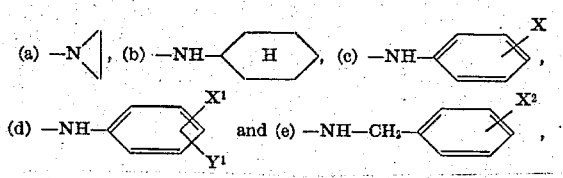

wherein X is selected from the group consisting of hydrogen, alkyl having 1 to 4 carbon atoms, alkoxy having 1 to 4 carbon atoms, R"CO—wherein R" is alkyl having 1 to 4 carbon atoms, chlorine group containing 2 to 5 carbon atoms, a halogen atom, alkoxy-carboxyl having 2 to 5 carbon atoms, R'''CONH—wherein R'''is alkyl having 1 to 4 carbon atoms, dialkylaminoethoxycarbonyl having 5 to 7 carbon atoms, dialkylamino having 2 to 8 carbon atoms, hydroxy, carboxy, sulfamoyl, nitro, cyano and phenyl; $X^1$ and $Y^1$ are the same or different and are selected from the group consisting of alkyl having 1 to 4 carbon atoms, hydroxy, carboxy and nitro; $X^2$ is selected from the group consisting of hydrogen, chlorine, and dialkylamino having 2 to 8 carbon atoms.

2. Methyl 5-[4'-(N,N-ethylenecarbamoyloxy)-6'-methoxy-7'-methyl-3'-oxo-5'-phthalanyl]-3-methyl-3-pentene-1- carboxylate in accordance with claim 1.

3. Ethyl 5-[4'-(N,N-ethylenecarbamoyloxy)-6'-methoxy-7'-methyl-3'-oxo-5'-phthalanyl]-3-methyl-3-pentene-1-carboxylate in accordance with claim 1.

4. Butyl 5-[4'-(N,N-ethylenecarbamoyloxy)-6'-methoxy-7'-methyl-3'-oxo-5'-phthalanyl]-3-methyl-3-pentene-1-carboxylate in accordance with claim 1.

5. Ethyl 5-[4'-{N-(p-acetylphenyl)-carbamoyloxy}-6'-methoxy-7'-methyl-3'-oxo-5'-phthalanyl]-3-methyl-3-pentene-1-carboxylate in accordance with claim 1.

6. Methyl 5-[4'-(N-phenylcarbamoyloxy)-6'-methoxy-7'-methyl-3'-oxo-5'-phthalanyl]-3-methyl-3-pentene-1-carboxylate in accordance with claim 1.

7. Ethyl 5-[4'-{N-(p-methylphenyl)-carbamoyloxy}-6'methoxy-7'-methyl-3'-oxo-5'-phthalanyl]-3-methyl-3-pentene-1-carboxylate in accordance with claim 1.

8. Ethyl 5-[4'-{N-(p-methoxyphenyl)-carbamoyloxy}-6'-methoxy-7'-methyl-3'-oxo-5'-phthalanyl]-3-methyl-3-pentene-1-carboxylate in accordance with claim 1.

9. Ethyl 5-[4'-{N-(p-hydroxyphenyl)-carbamoyloxy}-6'-methoxy-7'-methyl-3'-oxo-5'-phthalanyl]-3-methyl-3-pentene-1-carboxylate in accordance with claim 1.

10. Ethyl 5-[4'-{N-(p-carboxyphenyl)-carbamoyloxy}-6'-methoxy-7'-methyl-3'-oxo-5'-phthalanyl]-3-methyl-3-pentene-1-carboxylate in accordance with claim 1.

11. Ethyl 5-[4'-{N-(p-chlorophenyl)-carbamoyloxy}-6'-methoxy-7'-methyl-3'-oxo-5'-phthalanyl]-3-methyl-3-pentene-1-carboxylate in accordance with claim 1.

12. Ethyl 5-[4'-{N-(p-ethoxycarbonylphenyl)-carbamoyloxy}-6'-methoxy-7'-methyl-3'-oxo-5'-phthalanyl]-3-methyl-3-pentene-1-carboxylate in accordance with claim 1.

13. Ethyl 5-[4'-{N-(p-acetylaminophenyl)-carbamoyloxy}-6'-methoxy-7'-methyl-3'-oxo-5'-phthalanyl]-3-methyl-3-pentene-1-carboxylate in accordance with claim 1.

14. Ethyl 5-[4'-{N-(p-sulfamoylphenyl)-carbamoyloxy}-6'-methoxy-7'-methyl-3'-oxo-5'-phthalanyl]-3-methyl-3-pentene-1-carboxylate in accordance with claim 1.

15. Ethyl 5-[4'-{N-(p-phenylphenyl)-carbamoyloxy}-6'-methoxy-7'-methyl-3'-oxo-5'-phthalanyl]-3-methyl-3-pentene-1-carboxylate in accordance with claim 1.

16. Ethyl 5-[4'-{N-(p-diethylaminophenyl)-carbamoyloxy}-6'-methoxy-7'-methyl-3'-oxo-5'-phthalanyl]-3-methyl-3-pentene-1-carboxylate in accordance with claim 1.

17. Ethyl 5-[4'-{N-(p-(β-diethylaminoethoxy)-carbonylphenyl)-carbamoyloxy}-6'-methoxy-7'-methyl-3'-oxo-5'-phthalanyl]-3-methyl-3-pentene-1-carboxylate in accordance with claim 1.

18. Ethyl 5-[4'-{N-(p-dimethylaminophenyl)-carbamoyloxy}-6'-methoxy-7'-methyl-3'-oxo-5'-phthalanyl]-3-methyl-3-pentene-1-carboxylate in accordance with claim 1.

19. Ethyl 5-[4'-{N-(p-diethylaminobenzyl)-carbamoyloxy} - 6'-methoxy-7'-methyl-3'-oxo-5'-phthalanyl]-3-methyl-3-pentene-1-carboxylate in accordance with claim 1.

20. Ethyl 5-[4'-{N-(dimethylaminobenzyl)-carbamoyloxy}-6'-methoxy-7'-methyl-3'-oxo-5'-phthalanyl]-3-methyl-3-pentene-1-carboxylate in accordance with claim 1.

21. Butyl 5-[4'-{N-(p-carboxyphenyl)-carbamoyloxy}-6'-methoxy-7'-methyl-3'-oxo-5'-phthalanyl]-3-methyl-3-pentene-1-carboxylate in accordance with claim 1.

22. Ethyl 5-[4'-(N-phenylcarbamoyloxy)-6'-methoxy-7'-methyl-3'-oxo-5'-phthalanyl]-3-methyl-3-pentene-1-carboxylate in accordance with claim 1.

23. Ethyl 5-[4'-{N-(m-nitrophenyl)-carbamoyloxy}-6'-methoxy-7'-methyl-3'-oxo-5'-phthalanyl]-3-methyl-3-pentene-1-carboxylate in accordance with claim 1.

24. Ethyl 5-[4'-{N-(p-cyanophenyl)-carbamoyloxy}-6'-methoxy-7'-methyl-3'-oxo-5'-phthalanyl]-3-methyl-3-pentene-1-carboxylate in accordance with claim 1.

25. Ethyl 5-[4'-{N-(m-methylphenyl)-carbamoyloxy}-6'-methoxy-7'-methyl-3'-oxo-5'-phthalanyl]-3-methyl-3-pentene-1-carboxylate in accordance with claim 1.

26. Ethyl 5-[4'-{N-(m-chlorophenyl)-carbamoyloxy}-6'-methoxy-7'-methyl-3'-oxo-5'-phthalanyl]-3-methyl-3-pentene-1-carboxylate in accordance with claim 1.

27. Ethyl 5-[4'-{N-(3''-nitro-4''-methylphenyl)-carbamoyloxy}-6'-methoxy-7'-methyl-3'-oxo-5'-phthalanyl]-3-methyl-3-pentene-1-carboxylate in accordance with claim 1.

28. Ethyl 5-[4'-{N-(2'',4''-dimethylphenyl)-carbamoyloxy}-6'-methoxy-7'-methyl-3'-oxo-5'-phthalanyl]-3-methyl-3-pentene-1-carboxylate in accordance with cliam 1.

29. Ethyl 5-[4'-{N-(3''-oxy-4''-carboxyphenyl)-carbamoyloxy}-6'-methoxy-7'-methyl-3'-oxo-5'-phthalanyl]-3-methyl-3-pentene-1-carboxylate in accordance with claim 1.

30. Ethyl 5-[4'-(N-benzylcarbamoyloxy)-6'-methoxy-7'-methyl-3'-oxo-5'-phthalanyl]-3-methyl-3-pentene-1-carboxylate in accordance with claim 1.

31. Ethyl 5-[4'-{N-(m-chlorobenzyl)-carbamoyloxy}-6'-methoxy-7'-methyl-3'-oxo-5'-phthalanyl]-3-methyl-3-pentene-1-carboxylate in accordance with claim 1.

32. Ethyl 5-[4'-(N-cyclohexylcarbamoyloxy)-6'-methoxy-7'-methyl-3'-oxo-5'-phthalanyl]-3-methyl-3-pentene-1-carboxylate in accordance with claim 1.

* * * * *

UNITED STATES PATENT OFFICE
CERTIFICATE OF CORRECTION

Patent No. 3,853,919　　　　　Dated December 10, 1974

Inventor(s) Takasi Mori et al.

It is certified that error appears in the above-identified patent and that said Letters Patent are hereby corrected as shown below:

Column 3, Table 1, second column, line 10, "1++++" should read --++++--

Column 5, line 24, should read --Methoxy-7'-Methyl-3'-Oxo-5'-Phthalanyl]-3-Methyl--- line 33, the formula should read: --n-butyl 5-(4'-chloroformyloxy-6'-methoxy-7'- -- line 60, insert --N-- before -- -(p-acetylphenyl)...-- line 67, "7-Methyl-3'-..." should read --7'-Methyl-3'-... --

Column 6, line 11, insert --[-- after "Phthalanyl"

line 26, should read -- -Methyl-3- -- line 42, insert --)-- after "-phthalanyl"

Column 7, line 19, should read --Carbamoyloxy}-6'-Methoxy-7'-Methyl-3'-Oxo-5'- -- line 27, "448°" should read --148°-- line 55, "IN" should read --N--

Column 9, line 5, should read --oxo-5'-phthalanyl)-3-methyl-pentene-1-carboxylate-- line 27, should read --Ethyl 5-[4'-(N-Phenylcarbamoyloxy)-6'-Methoxy- -- line 43, should read --5-(4'-chloroformyloxy-6'-methoxy-7'-methyl-3'-oxo- --

Column 10, line 49, "21.1" should read --2.1--

Column 12, claim 9, line 1, should read --Ethyl 5-[4'-{N-(p-hydroxyphenyl)- --

Signed and Sealed this eleventh Day of November 1975

[SEAL]

Attest:

RUTH C. MASON
Attesting Officer

C. MARSHALL DANN
Commissioner of Patents and Trademarks